(12) United States Patent
Taleb et al.

(10) Patent No.: US 12,434,629 B2
(45) Date of Patent: Oct. 7, 2025

(54) METHOD FOR DETECTING A FAILURE IN A SOLID-STATE LIGHT SOURCE OF AN AUTOMOTIVE LIGHTING DEVICE AND AUTOMOTIVE ARRANGEMENT

(71) Applicant: VALEO VISION, Bobigny (FR)

(72) Inventors: Rabih Taleb, Bobigny (FR); Hafid El-Idrissi, Bobigny (FR); Marouene Karray, Bobigny (FR)

(73) Assignee: Valeo Vision, Bobigny (FR)

( * ) Notice: Subject to any disclaimer, the term of this patent is extended or adjusted under 35 U.S.C. 154(b) by 82 days.

(21) Appl. No.: 18/248,895

(22) PCT Filed: Oct. 15, 2021

(86) PCT No.: PCT/EP2021/078707
§ 371 (c)(1),
(2) Date: Apr. 13, 2023

(87) PCT Pub. No.: WO2022/079298
PCT Pub. Date: Apr. 21, 2022

(65) Prior Publication Data
US 2023/0382300 A1    Nov. 30, 2023

(30) Foreign Application Priority Data
Oct. 15, 2020    (FR) ..................... 2010588

(51) Int. Cl.
*H05B 45/56*    (2020.01)
*B60Q 11/00*    (2006.01)
*G01J 3/50*    (2006.01)

(52) U.S. Cl.
CPC .............. *B60Q 11/005* (2013.01); *G01J 3/50* (2013.01); *H05B 45/56* (2020.01)

(58) Field of Classification Search
CPC ........ H05B 45/18; H05B 45/28; H05B 45/50; H05B 45/56; H05B 45/58; B60Q 1/04; B60Q 1/0408; B60Q 11/00; B60Q 11/005
See application file for complete search history.

(56) References Cited

U.S. PATENT DOCUMENTS 8,841,848 B2    9/2014    Ogata et al.
10,231,312 B2   3/2019    Kato et al.
(Continued)

FOREIGN PATENT DOCUMENTS

| CN | 103141159 A | 6/2013 | |
| DE | 102011120781 A1 * | 6/2013 | ........... B60Q 11/005 |
| WO | 2013140280 A2 | 9/2013 | |

OTHER PUBLICATIONS

European Patent Office, International Search Report and Written Opinion of corresponding International Application No. PCT/EP2021/078707, dated Feb. 10, 2022.
(Continued)

*Primary Examiner* — Thai Pham
(74) *Attorney, Agent, or Firm* — Valeo Vision (57) ABSTRACT

This invention provides a method for detecting a failure in a solid-state light source of an automotive lighting device. This method provides an estimated temperature profile for the lighting device, measures an actual temperature profile of the lighting device and compares the estimated temperature profile with the actual temperature profile in order to detect a difference between them.

13 Claims, 7 Drawing Sheets

(56) References Cited

U.S. PATENT DOCUMENTS

| | | | | |
|---|---|---|---|---|
| 11,137,449 B1* | 10/2021 | De Cicco | ............... | H05B 45/30 |
| 2005/0082553 A1* | 4/2005 | Yamamoto | ............. | H05B 45/56 |
| | | | | 257/83 |
| 2009/0140658 A1 | 6/2009 | Jo et al. | | |
| 2018/0184495 A1* | 6/2018 | Pelz | ....................... | B60Q 11/00 |
| 2018/0306855 A1* | 10/2018 | Gloss | ..................... | H05B 45/60 |
| 2022/0104327 A1* | 3/2022 | Martinez Perez | . | H05B 45/3725 |

OTHER PUBLICATIONS

China Patent Office, First Office Action (with English translation) and Search Report for corresponding application No. CN202180065785.9, dated Jul. 23, 2025, 17 pages.

* cited by examiner

METHOD FOR DETECTING A FAILURE IN A SOLID-STATE LIGHT SOURCE OF AN AUTOMOTIVE LIGHTING DEVICE AND AUTOMOTIVE ARRANGEMENT

TECHNICAL FIELD

This invention is related to the field of automotive lighting devices, and more particularly, to the temperature management of these devices.

BACKGROUND OF THE INVENTION

Digital lighting devices are being increasingly adopted by car makers for middle and high market products.

These digital lighting devices usually comprise solid-state light sources, the operation of which heavily depends on temperature.

These lighting devices comprise solid-state light sources, such as Light Emitting Diodes (LEDs). Each of these LEDs are individual elements which may fail in an independent way with respect to the rest of LEDs.

Detecting a performance decrease or a failure on a particular LED within a lighting module is not always easy, mainly when this module may comprise thousands of LEDs and the only parameters to be measured are the global voltage and the current. Hence, it is not possible to detect the failure of a particular LED before happening.

SUMMARY OF THE INVENTION

This problem has been assumed until now, but a solution therefor is sought.

The invention provides an alternative solution for detecting and isolating failures in light sources of an automotive lighting device by a method for detecting a failure in a solid-state light source of an automotive lighting device according to the invention. Preferred embodiments of the invention are defined in dependent claims.

Unless otherwise defined, all terms (including technical and scientific terms) used herein are to be interpreted as is customary in the art. It will be further understood that terms in common usage should also be interpreted as is customary in the relevant art and not in an idealised or overly formal sense unless expressly so defined herein.

In this text, the term "comprises" and its derivations (such as "comprising", etc.) should not be understood in an excluding sense, that is, these terms should not be interpreted as excluding the possibility that what is described and defined may include further elements, steps, etc.

In a first inventive aspect, the invention provides a method for detecting a failure in a solid-state light source of an automotive lighting device, the method comprising the steps of:
  providing an estimated temperature profile for the lighting device;
  measuring an actual temperature profile of the lighting device; and
  compare the estimated temperature profile with the actual temperature profile in order to detect a difference between them.

The term "solid state" refers to light emitted by solid-state electroluminescence, which uses semiconductors to convert electricity into light. Compared to incandescent lighting, solid state lighting creates visible light with reduced heat generation and less energy dissipation. The typically small mass of a solid-state electronic lighting device provides for greater resistance to shock and vibration compared to brittle glass tubes/bulbs and long, thin filament wires. They also eliminate filament evaporation, potentially increasing the lifespan of the illumination device. Some examples of these types of lighting comprise semiconductor light-emitting diodes (LEDs), organic light-emitting diodes (OLED), or polymer light-emitting diodes (PLED) as sources of illumination rather than electrical filaments, plasma or gas.

With this method, a failure in a solid-state light source may be detected, due to the difference between the estimated temperature profile and the actual temperature profile. When a lighting functionality is activated, the estimated temperature profile provides an estimation of the evolution of the temperature of the lighting device with time, provided a plurality of data about the vehicle and the environment.

When a lighting device does not follow this temperature estimation, it may be due to a failure or malfunction in one or more of the light sources. The method of the invention allows this detection.

In some particular embodiments, the step of using the values to estimate the temperature of the lighting device comprises the use of a machine learning algorithm.

A machine learning algorithm may be used for estimating the temperature of the lighting device. Since some embodiments comprise temperature sensors to check the estimation values, these algorithms may adapt the estimated data to the real data, thus improving their accuracy.

In some particular embodiments, the method further comprises the steps of:
  in the event of a difference between the actual temperature profile and the estimated temperature profile, activate a particular lighting functionality only in a section of the lighting device
  measuring a second actual temperature profile in the lighting device
  measuring a third actual temperature profile in the section of the lighting device
  compare the estimated temperature profile with the second actual temperature profile and with the third actual temperature profile.

In this case, if a difference is detected, it may be due to a possible failure in one of the light sources. For a particular module configuration and particular ambient and vehicle data (used to provide the estimated profile) the temperature should be according to the estimated pattern. If it falls below these values, it may be due a malfunctioning of one of the light sources. The repetition of the method in a particular section of the lighting device with a lighting functionality which provides a different flux value in the corresponding section will provide an additional testing tool to verify if there is a failure or not.

In some particular embodiments, the method further comprises the steps of:
  in the event of a difference between the actual temperature profile and the estimated temperature profile, perform a second lighting functionality in the same section of the lighting device
  measuring a fourth actual temperature profile in the lighting device
  measuring a fifth actual temperature profile in the section of the lighting device
  compare the estimated temperature profile with the fourth actual temperature profile and with the fifth actual temperature profile.

A different lighting functionality may be used in the same section for a better verification of the failure.

In some particular embodiments, the first lighting functionality is one of Adaptive Driving Beam (ADB), Hazard Warning (HW) or Dynamic Bending Light (DBL) and the second lighting functionality is different from the first lighting functionality and is one of Adaptive Driving Beam (ADB), Hazard Warning (HW) or Dynamic Bending Light (DBL).

These lighting functionalities demand a very particular flux pattern (black in the case of the ADB or DBL, very bright in the event of HW) which may provide a better contrast than the data retrieved in the original light pattern.

In some particular embodiments, the step of activating a particular lighting functionality is performed subsequently in more than one section of the lighting device.

If one section does not provide the difference between the estimated and the actual temperature profiles, the control unit of the vehicle will choose a different section to isolate the zone of the lighting device where the failure is located.

In some particular embodiments, the section of the lighting device is chosen by an AI algorithm.

When different failure cases are identified and isolated, the AI algorithm will provide hints to the control unit to check the possible failures in particular sections of the lighting device.

In a further inventive aspect, the invention provides a data processing element comprising means for carrying out the steps of a method according to the first inventive aspect and a computer program comprising instructions which, when the program is executed by a control unit, cause the control unit to carry out the steps of a method according to the first inventive aspect.

In a further inventive aspect, the invention provides an automotive lighting arrangement comprising:
- an automotive lighting device comprising in turn a matrix arrangement of solid-state light sources, a plurality of auxiliary sensors configured to provide some device data and a control unit for performing the steps of the method according to the first inventive aspect; and
- a plurality of temperature sensors.

This lighting arrangement provides the advantageous functionality of detecting and isolating failures in zones of the lighting device.

In some particular embodiments, the matrix arrangement comprises at least 2000 solid-state light sources.

A matrix arrangement is a typical example for this method. The rows may be grouped in projecting distance ranges and each column of each group represent an angle interval. This angle value depends on the resolution of the matrix arrangement, which is typically comprised between 0.01° per column and 0.5° per column. As a consequence, many light sources may be managed at the same time.

BRIEF DESCRIPTION OF DRAWINGS

To complete the description and in order to provide for a better understanding of the invention, a set of drawings is provided. Said drawings form an integral part of the description and illustrate an embodiment of the invention, which should not be interpreted as restricting the scope of the invention, but just as an example of how the invention can be carried out. The drawings comprise the following figures.

DETAILED DESCRIPTION OF THE INVENTION

Figure 1:
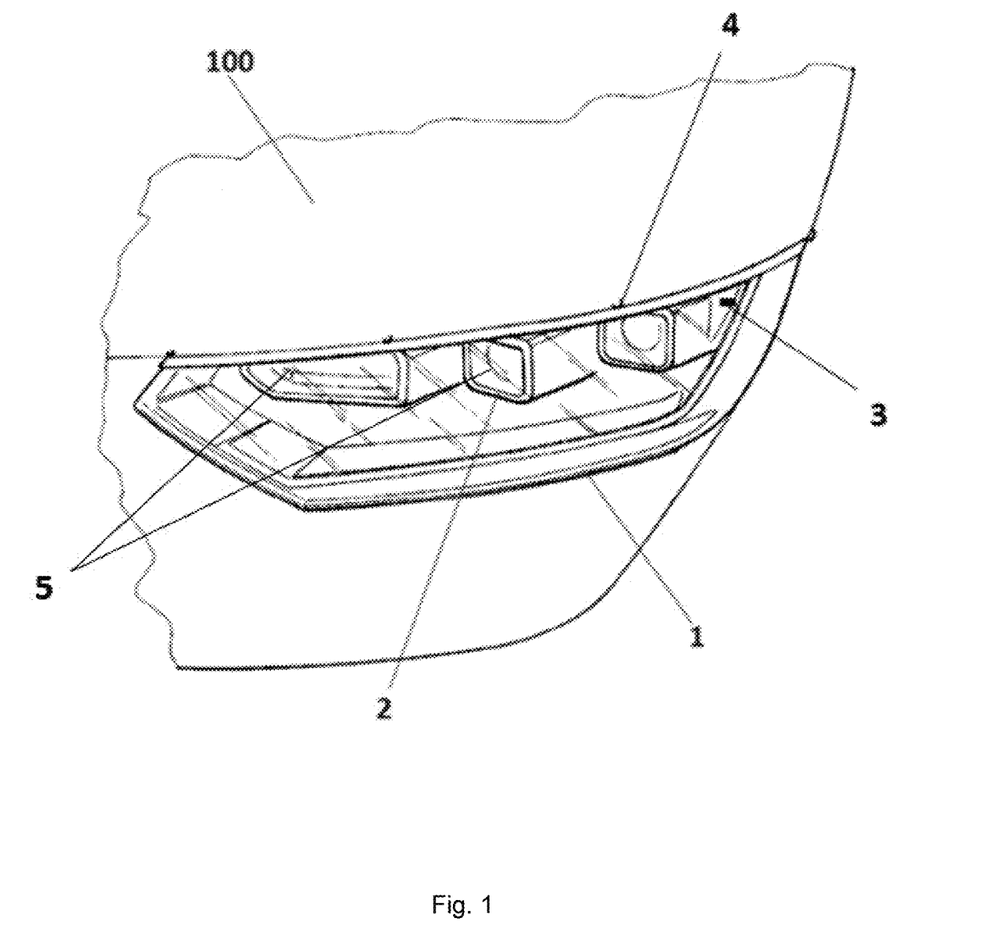
FIG. 1 shows a general perspective view of an automotive lighting device and a sensor comprised in an automotive arrangement according to the invention.

To complete the description and in order to provide for a better understanding of the invention, a set of drawings is provided. Said drawings form an integral part of the description and illustrate an embodiment of the invention, which should not be interpreted as restricting the scope of the invention, but just as an example of how the invention can be carried out. The drawings comprise the following figures:

FIG. 1 shows a general perspective view of an automotive lighting device and a sensor comprised in an automotive arrangement according to the invention.

Figure 2A:
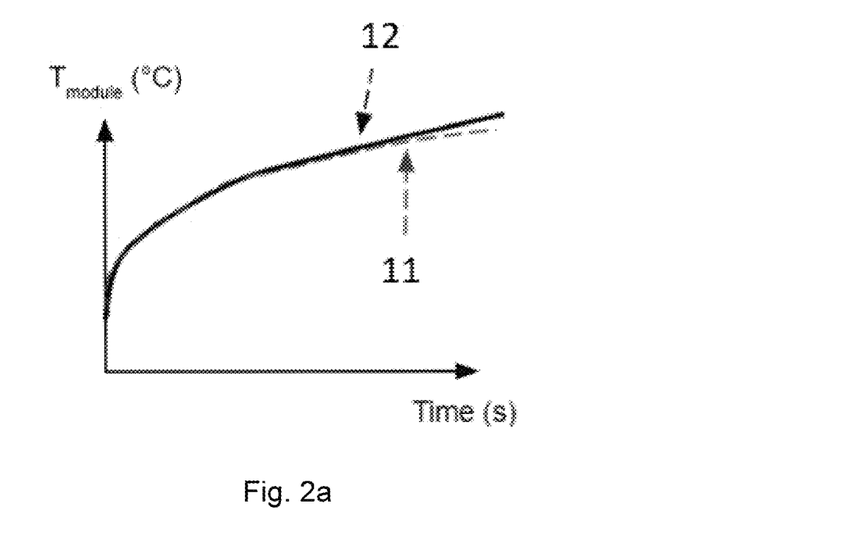
FIGS. 2a, 2b and 2c show three different temperature measurements in a headlamp.
Figure 2B:
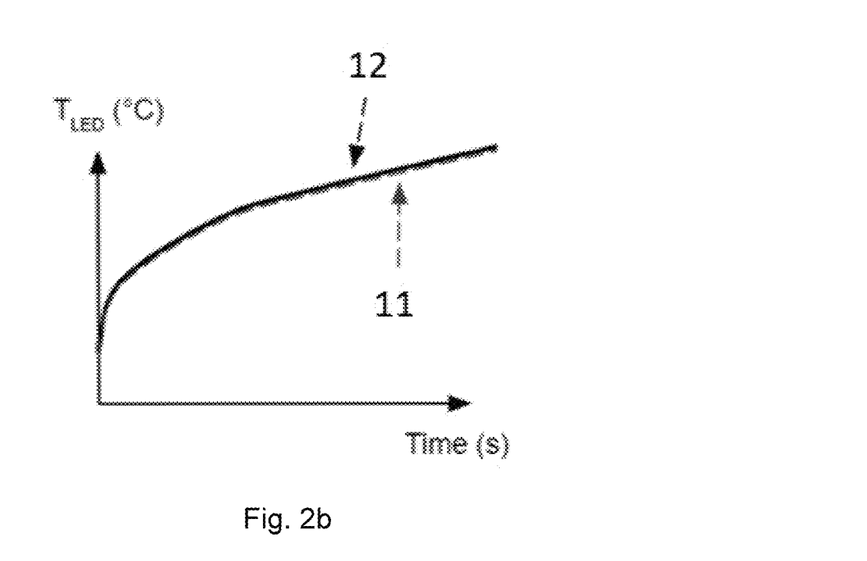
Figure 2C:
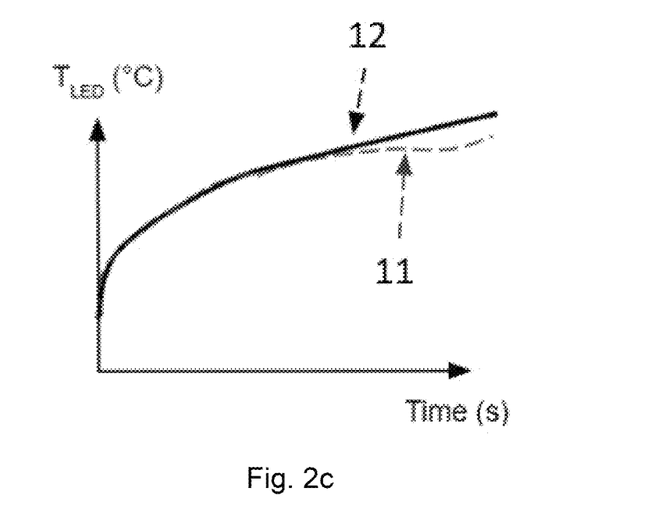

FIGS. 2a, 2b and 2c show three different temperature measurements in a headlamp.

Figure 3A:
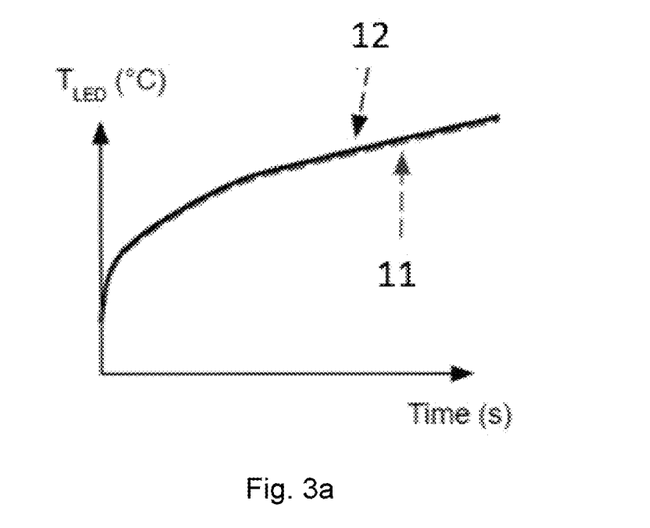
FIGS. 3a, 3b and 3c show three different temperature measurements in a headlamp when an ADB lighting functionality is activated.
Figure 3B:
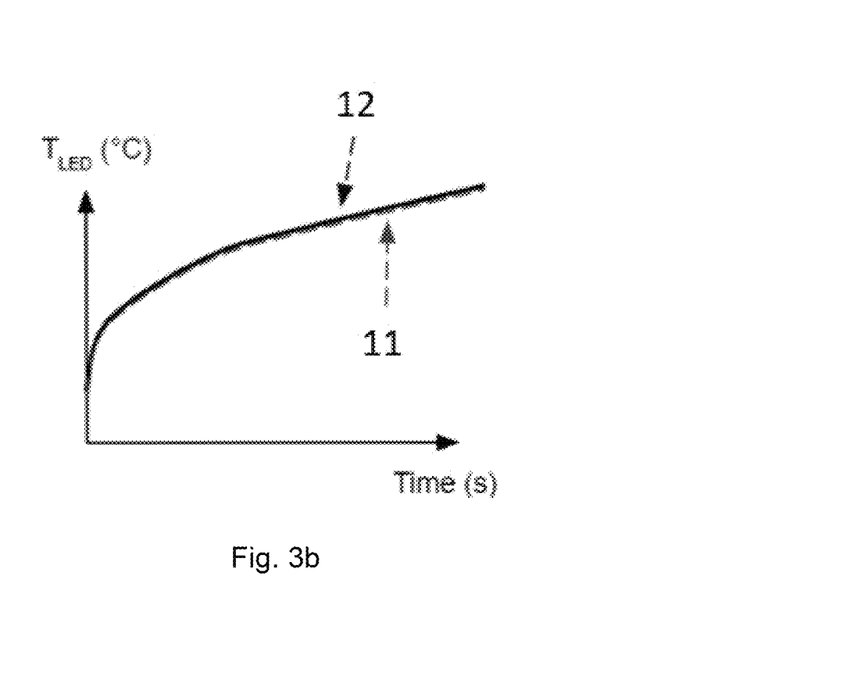
Figure 3C:
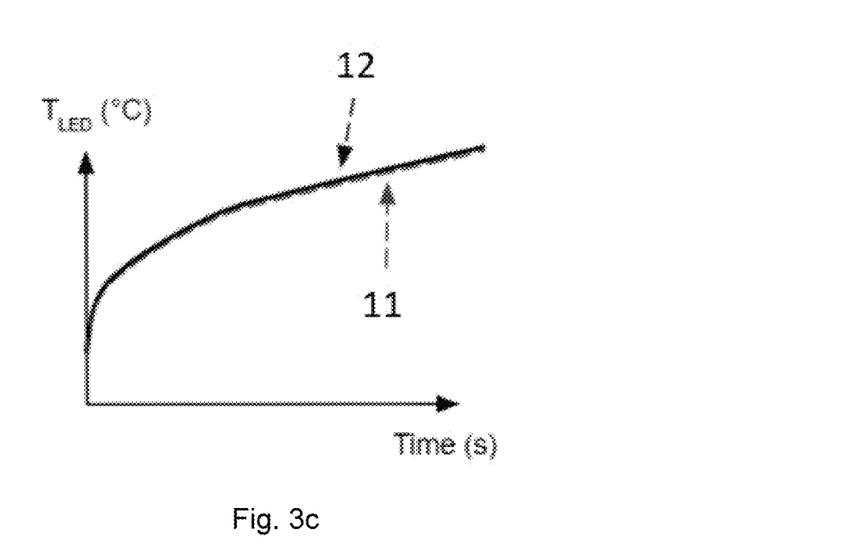

FIGS. 3a, 3b and 3c show three different temperature measurements in a headlamp when an ADB lighting functionality is activated.

Figure 4A:
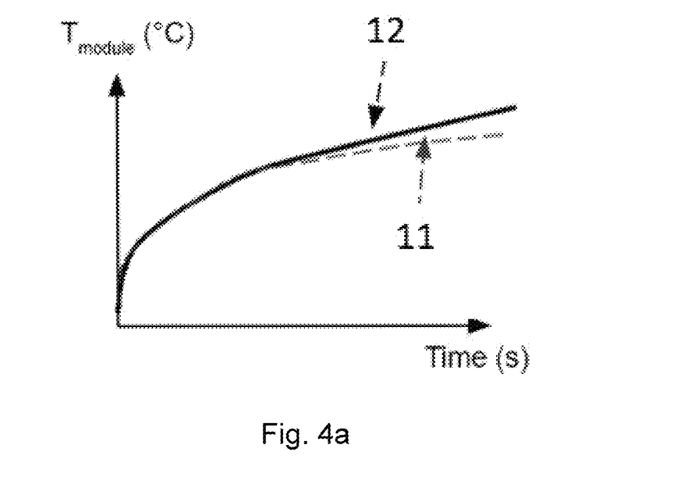
FIGS. 4a, 4b and 4c show three different temperature measurements in a headlamp when a HW lighting functionality is activated.
Figure 4B:
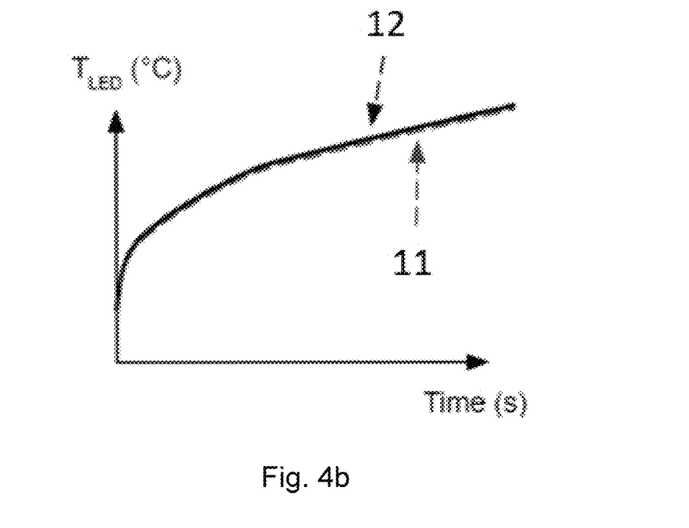
Figure 4C:
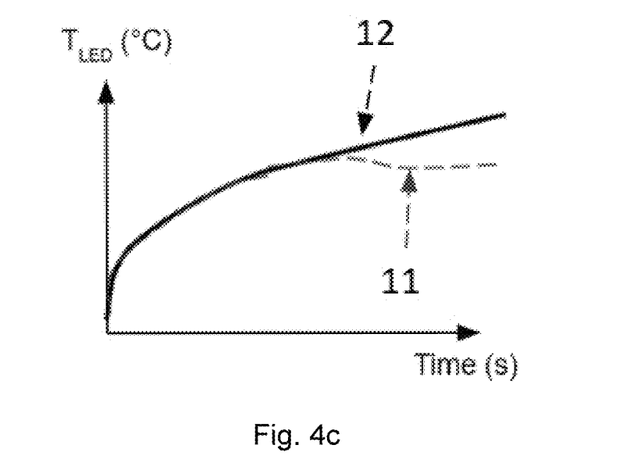

FIGS. 4a, 4b and 4c show three different temperature measurements in a headlamp when a HW lighting functionality is activated.

In these figures, the following reference numbers have been used:
1 Headlamp
2 LED
3 Control unit
4 Auxiliary sensors
5 Temperature sensors
11 Estimated temperature profile
12 Actual temperature profile
100 Automotive vehicle The example embodiments are described in sufficient detail to enable those of ordinary skill in the art to embody and implement the systems and processes herein described. It is important to understand that embodiments can be provided in many alternate forms and should not be construed as limited to the examples set forth herein.

Accordingly, while embodiment can be modified in various ways and take on various alternative forms, specific embodiments thereof are shown in the drawings and described in detail below as examples. There is no intent to limit to the particular forms disclosed. On the contrary, all modifications, equivalents, and alternatives falling within the scope of the appended claims should be included.

FIG. 1 shows a general perspective view of a headlamp 1 and a plurality of sensors comprised in an automotive arrangement according to the invention.

This headlamp 1 is installed in an automotive vehicle 100 and comprises
- a matrix arrangement of LEDs 2, intended to provide a light pattern;
- a control unit 3 to perform a thermal analysis of the operation of the LEDs 2; and
- a plurality of auxiliary sensors 4 intended to provide device data a plurality of temperature sensors 5 intended to provide temperature measurements of different sections of the matrix arrangement.

This matrix configuration is a high-resolution module, having a resolution greater than 2000 pixels. However, no restriction is attached to the technology used for producing the projection modules.

The control unit 3, previously to its installation in the automotive headlamp 1, has undergone a training process to provide an estimated temperature profile for different sections of the headlamp, depending on the data received by the auxiliary sensors 4. This control unit has undergone a training process to be able to provide accurate temperature estimation profiles.

FIGS. 2a, 2b and 2c show three different temperature measurements in a headlamp.

First one, illustrated in FIG. 2a, refers to the temperature evolution in an overall approach of the headlamp. Continuous line shows an estimated temperature profile 11, which has been estimated taking into account the physical features of the headlamp and environmental conditions of the vehicle (speed, exterior temperature, presence of other vehicle, activation of different lighting functionalities in the headlamp . . . ). This temperature estimation has also undergone an AI algorithm, to provide an even more accurate estimation.

Dashed line shows the real measured temperature 12, which is provided by temperature sensors located in the headlamp.

As may be seen in this FIG. 2a, there is a slight deviation of the real measured temperature against the ideal estimated temperature.

FIGS. 2b and 2c show these temperature measurements in different sections of the headlamp. FIG. 2b shows a section where the temperature evolution perfectly matches with the temperature estimation, so, in this section, the LEDs work properly. However, FIG. 2c shows a section where the temperature evolution shows a deviation with respect to the estimated one.

Since this is a slight deviation, this indicates that there is a possibility of a LED failure, but this should be confirmed with a more detailed diagnosis.

To do this detailed diagnosis, a particular lighting functionality, such as ADB, DBL or HW, is activated. These lighting functionalities have the particular feature of isolating a particular section of the LEDs and performing a totally different light pattern in this section.

FIGS. 3a, 3b and 3c show the temperature evolution in different sections of the headlamp when an ADB functionality is activated concerning a particular section of the LED arrangement.

This ADB functionality is normally used to avoid glaring a vehicle coming in the opposite lane, or to avoid glaring a vehicle which is circulating in the same lane, but a few meters ahead.

In this method, this functionality is used to check if the temperature estimation is correct and to confirm if the section which produced the temperature deviation could be defective. The ADB functionality is used in FIGS. 3a, 3b and 3c to obscure the allegedly defective section of the LED arrangement of FIG. 2c. FIG. 3a shows the temperature estimation profile of the whole headlamp when the ADB function is applied to the problematic section of FIG. 2c.

Since the problematic section is not working, all the active LEDs are working properly and therefore the actual measured temperature 12 coincides with the estimated temperature profile 11.

When applied to the problematic section, in FIG. 3c, since it is turned off due to the ADB functionality, the temperature in this section also matches with the estimated one.

When applied to a LED section different from the problematic one, as shown in FIG. 3b, the actual measured temperature profile also matches with the estimated one, so there are no more problematic sections.

In FIGS. 4a, 4b and 4c, an additional method is used to isolate and identify the failing LEDs.

A HW functionality is activated in the problematic section.

FIG. 4a shows the temperature estimation profile of the whole headlamp when the HW functionality is operated in the problematic section. As in the case of FIG. 2a, there is a deviation in the actual measured temperature profile 12 with respect to the estimated temperature profile 11, which means that some failure may be taking place.

FIG. 4b shows the temperature profile in a section which is far from the problematic section. In this figure, the actual measure temperature profile 12 matches with the estimated temperature profile 11, so there is no malfunctioning of this section.

FIG. 4c shows the temperature profiles in the problematic section. Since the use of the HW functionality is a highly demanding one, the failing LEDs cause a temperature drop when time advances, providing an evidence of the failure of some LEDs in this section.

Hence, this method is able to detect and isolate a particular section of the LED arrangement where the failure takes place.

Figure 5:
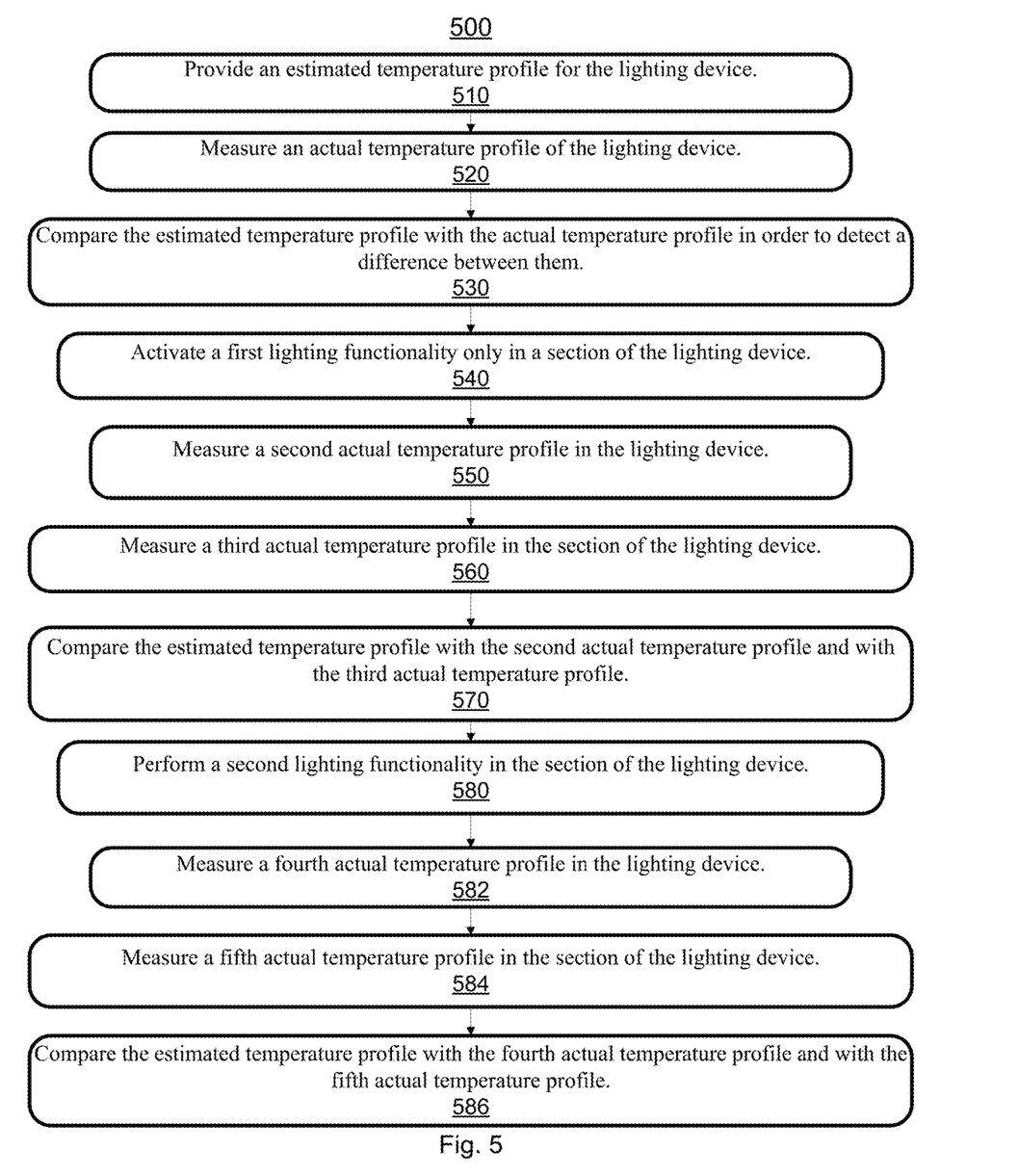
FIG. 5 shows an illustrative flow-chart method to detect a failure in a solid-state light source of an automotive lighting device.

FIG. 5 illustratively depicts an embodiment of the invention and describes the process or method 500 of detecting a failure in a solid-state light source of an automotive lighting device. Among the variable method embodiments for example, two blocks shown in succession may in fact be executed substantially concurrently or the associated blocks may sometimes be executed in the reverse order, depending upon the functionality involved. It will also be noted that each block of the block diagrams or flowchart illustration, and combinations of blocks in the block diagrams or flowchart illustration, can be implemented by both manual or automated systems that perform the specified functions or by acts or carry out combinations of special purpose hardware and control instructions.

In block 510, an estimated temperature profile for the lighting device is provided. In block 520, an actual temperature profile of the lighting device is measured. In block 530, the estimated temperature profile is compared to the actual temperature profile in order to detect a difference. In block 540, a first lighting functionality only in a section of the lighting device is activated. In block 550, a second actual temperature profile in the lighting device is measured. In block 560, a third actual temperature profile in the section of the lighting device is measured. In block 570, the estimated temperature profile is compared to the second actual temperature profile and the third actual temperature profile. In block 580, a second lighting functionality in the section of the lighting device is performed. In block 582, a fourth actual temperature profile in the lighting device is measured. In block 584, a fifth actual temperature profile in the section of the lighting device is measured. In block 586, the estimated temperature profile is compared to the fourth actual temperature profile and to the fifth actual temperature profile.

What is claimed is:

1. A method for detecting a failure in a solid-state light source of an automotive lighting device, the method comprising:
   providing, by a control unit, an estimated temperature profile for the lighting device;
   measuring, with one of a plurality temperature sensor, an actual temperature profile of the lighting device;
   comparing, by the control unit, the estimated temperature profile with the actual temperature profile in order to detect a difference between the estimated temperature profile and the actual temperature profile;
   activating, by the control unit, a first lighting functionality only in a section of the lighting device;
   measuring, with one of the plurality temperature sensor, a second actual temperature profile in the lighting device;
   measuring, with one of the plurality temperature sensor, a third actual temperature profile in the section of the lighting device; and
   comparing, by the control unit, the estimated temperature profile with the second actual temperature profile and with the third actual temperature profile.

2. The method according to claim 1, wherein providing the estimated temperature profile includes:
   checking data of at least one temperature sensor; and
   checking data of one vehicle speed sensor; and
   checking an activation of lighting functionalities; and
   estimating the temperature of the lighting device by utilizing one or more of the data of at least one temperature sensor, the data of one vehicle speed sensor, and the activation of lighting functionalities.

3. The method according to claim 2, wherein estimating the temperature of the lighting device includes using of a machine learning algorithm.

4. The method according to claim 1, further comprising:
   performing, by the control unit, a second lighting functionality in the section of the lighting device;
   measuring, with one of the plurality temperature sensor, a fourth actual temperature profile in the lighting device;
   measuring, with one of the plurality temperature sensor, a fifth actual temperature profile in the section of the lighting device; and
   comparing, by the control unit, the estimated temperature profile with the fourth actual temperature profile and with the fifth actual temperature profile.

5. The method according to claim 4, wherein the first lighting functionality is one of Adaptive Driving Beam, hazard warning or Dynamic Bending Light and the second lighting functionality is one of Adaptive Driving Beam, hazard warning or Dynamic Bending Light, with the second lighting functionality being different than the first lighting functionality.

6. The method according to claim 1, wherein activating the first lighting functionality is performed subsequently in more than one section of the lighting device.

7. The method according to claim 6, wherein the more than one section of the lighting device is chosen by an artificial intelligence (AI) algorithm.

8. The method according to claim 1, wherein providing the estimated temperature profile includes:
   checking the data of at least one temperature sensor; or
   checking the data of one vehicle speed sensor; or
   checking the activation of lighting functionalities; and
   using one or more of the data of at least one temperature sensor, the data of one vehicle speed sensor, and the activation of lighting functionalities to estimate the temperature of the lighting device.

9. The method according to claim 1, wherein providing the estimated temperature profile includes:
   checking the data of at least one temperature sensor; and
   checking the data of one vehicle speed sensor; or
   checking the activation of lighting functionalities; and
   using one or more of the data of at least one temperature sensor, the data of one vehicle speed sensor, and the activation of lighting functionalities to estimate the temperature of the lighting device.

10. The method according to claim 1, wherein providing the estimated temperature profile includes:
    checking the data of at least one temperature sensor; or
    checking the data of one vehicle speed sensor; and
    checking the activation of lighting functionalities; and
    using one or more of the data of at least one temperature sensor, the data of one vehicle speed sensor, and the activation of lighting functionalities to estimate the temperature of the lighting device.

11. The method according to claim 1, wherein providing the estimated temperature profile includes:
    checking the data of one vehicle speed sensor; and
    checking the data of at least one temperature sensor; or
    checking the activation of lighting functionalities; and
    using one or more of the data of at least one temperature sensor, the data of one vehicle speed sensor, and the activation of lighting functionalities to estimate the temperature of the lighting device.

12. An automotive lighting arrangement comprising:
    an automotive lighting device including a matrix arrangement of solid-state light sources, a plurality of auxiliary sensors configured to provide some device data, a plurality of temperature sensors, and a control unit, with the control unit configured to:
    provide, by the control unit, an estimated temperature profile for the lighting device;
    measure, with one of the plurality of temperature sensors, an actual temperature profile of the lighting device;
    compare, by the control unit, the estimated temperature profile with the actual temperature profile in order to detect a difference between the estimated temperature profile and the actual temperature profile;
    activate, by the control unit, a first lighting functionality only in a section of the lighting device;
    measure, with one of the plurality of temperature sensors, a second actual temperature profile in the lighting device;
    measure, with one of the plurality of temperature sensors, a third actual temperature profile in the section of the lighting device; and
    compare, by the control unit, the estimated temperature profile with the second actual temperature profile and with the third actual temperature profile.

13. The automotive arrangement according to claim 12, wherein the matrix arrangement includes at least 2000 solid-state light sources.

* * * * *